UNITED STATES PATENT OFFICE.

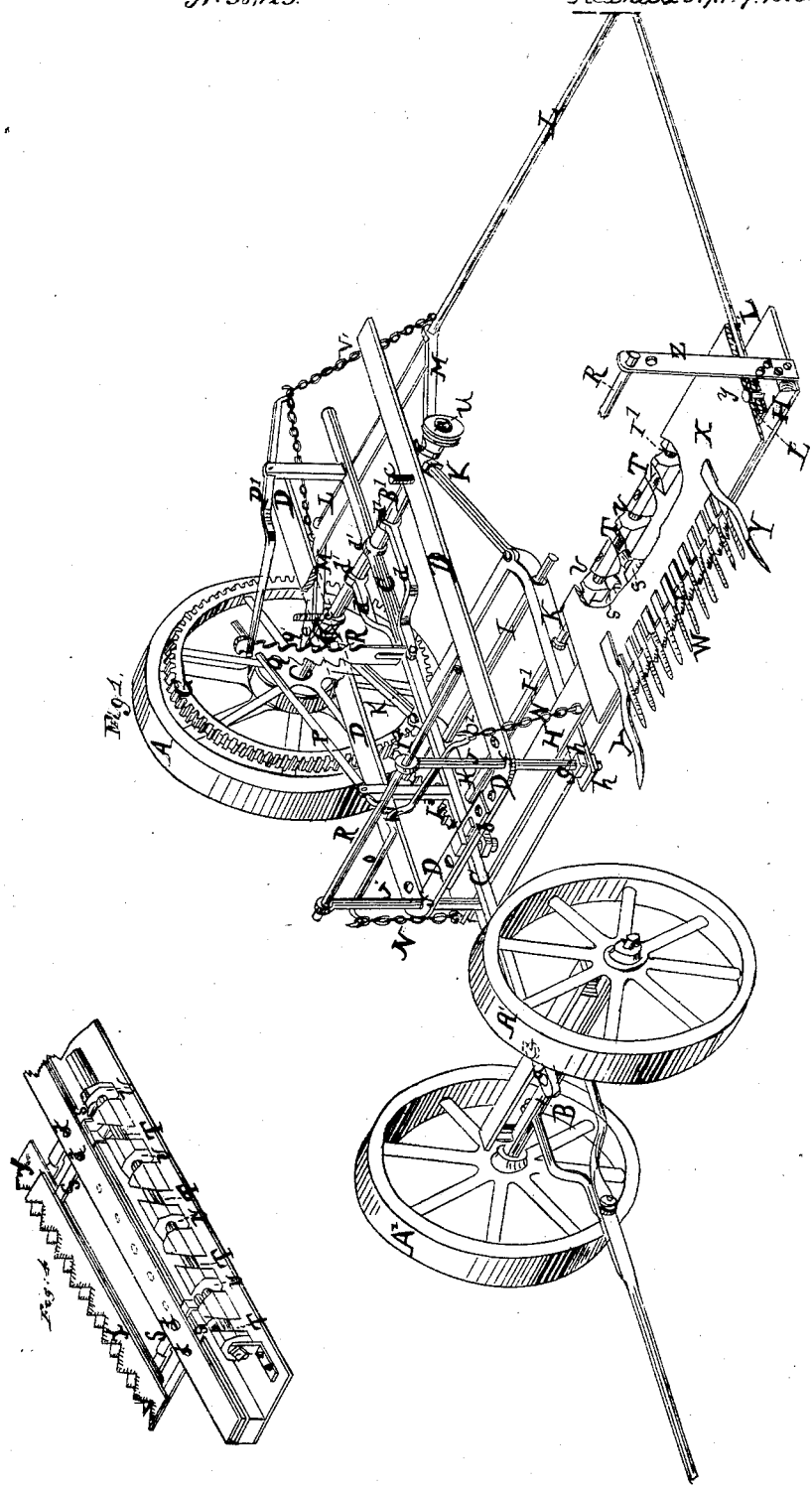

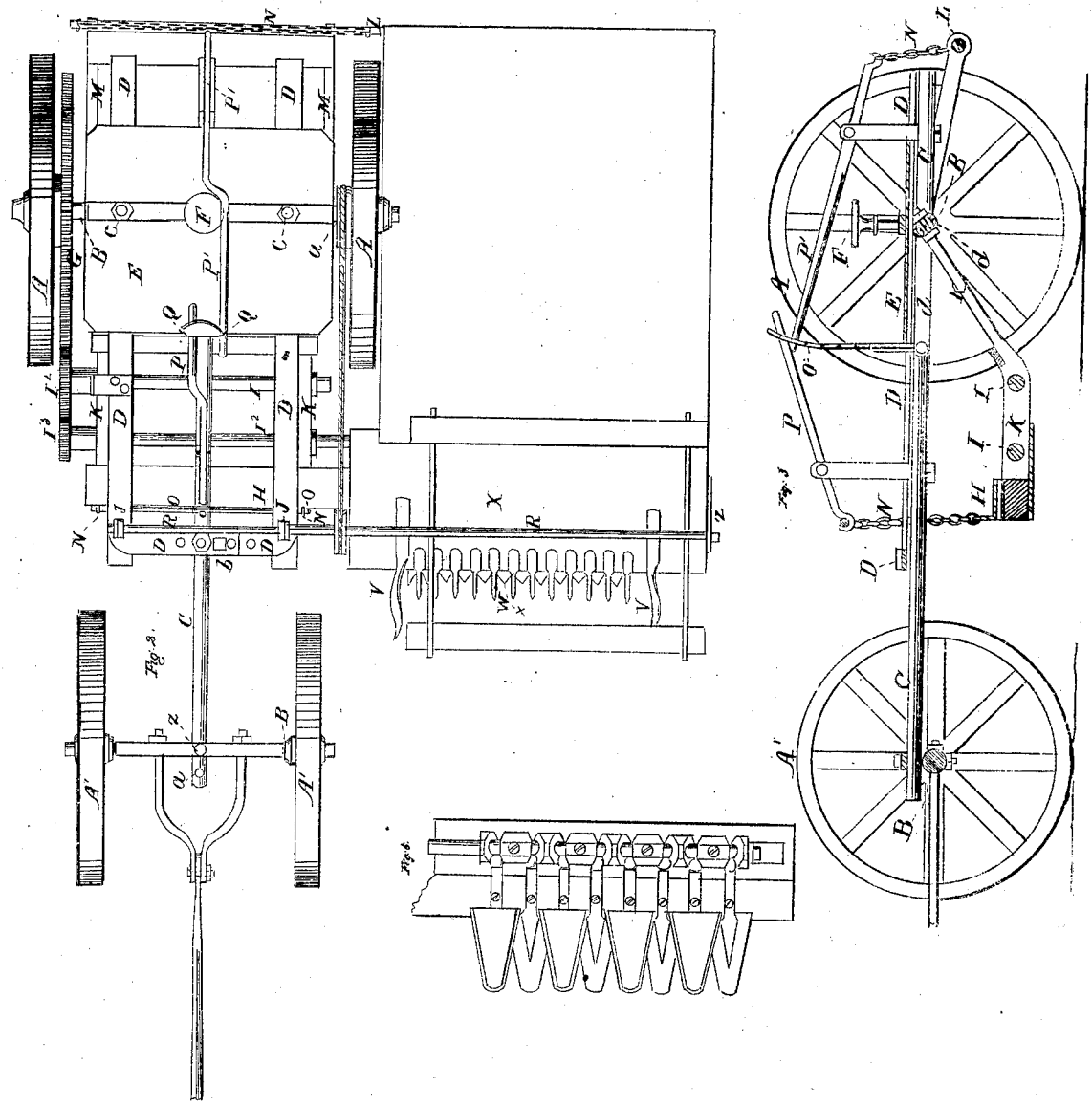

JABEZ J. PIGGOTT, OF BELLEVILLE, AND C. L. CROWELL, OF PEORIA, ILL.

IMPROVEMENT IN HARVESTERS.

Specification forming part of Letters Patent No. 38,123, dated April 7, 1863.

*To all whom it may concern:*

Be it known that we, JABEZ J. PIGGOTT and C. L. CROWELL, the former of Belleville, in the county of St. Clair, State of Illinois, and the latter of the city and county of Peoria, State aforesaid, have invented certain new and useful Improvements in Combined Reaping and Mowing Machines; and we do hereby declare that the following is a full, clear, and exact description of the same, reference being had to the accompanying drawings, forming part of this specification, in which—

Figure 1 is a perspective view of our improved machine, some of the parts having been removed in order to expose to view other more important parts. Fig. 2 is a plan of the machine complete. Fig. 3 is a vertical longitudinal section of the same. Fig. 4 is a perspective view of one style of cutting apparatus, and Fig. 5 a plan of another style.

The same letters of reference in each of the several figures indicate corresponding parts.

A A' represent four wheels, with their axles B B' connected together by a long reach or pole, C, which is provided with several king-pin holes, $a$ $a$, so that the front and rear wheels may be brought nearer together or set farther apart, as may be necessary to overcome side draft of the harvester.

D is a metal or wood frame bolted firmly upon the hind axle and upon the pole or reach C. This frame may be made in two halves longitudinally, which lap one another, as shown at $b$. The lapping portions may be perforated with a series of holes, which, in connection with the eye-bolts $c$ $c$, encircling the hind axle and bolting the frame D in place, allow the frame to be extended or contracted in width, and thus adapted to different lengths of axles. The perforations and the eyebolts $c$ $c$ might also admit of the tongue and reach of the carriage being set oblique to the track of the wheels, either inward or outward, and thus regulate the leverage of the carriage in such manner as to overcome the side draft of the grain side of the machine.

The hounds $d$ $d$, as well as the reach itself, are attached to the hind axle by means of eyes $d'$ $d'$ $d'$, so that the axle may turn independently of the reach.

The wheels A A A' A' are free to revolve on the front and hind axles, and the front axle has freedom to sweep round on the king-bolt $z$ in turning the machine around a corner.

E is a platform, with a driver's seat, F, mounted upon it. This platform is so located on the frame D that the seat F is directly over the hind axle.

G is a large spur-wheel bolted to the inner side of the right-hand hind wheel.

On a side-draft carriage, or an ordinary farm-wagon modified as above described, our combined reaper and mower is supported and adjusted as follows: The finger-beam H, which may be of any desired shape in its transverse section, with the gear-shafts I I$^2$, gearing I$^2$ I$^3$, and the reel-supports J J, are attached to the lower ends of radial arms K K, which extend out from the front of the hind axle, and are fitted to the axle so as to turn with it.

The combined back and side beam, L, of the harvester is made of tight, strong metal, and slightly elastic, and is attached to the lower rear ends of swinging radial arms M M, which are fitted to the axle by eyes $e$ $e$, which form a loose hinge and allow the axle to turn independently of the arms, and the arms to turn or swing independently of the axle. This beam forms a right angle, and extends from the arms M M to the grain end of the finger-beam H, and bolts to the same, as shown at $y$.

In order to adjust, control, and stay the finger-beam, L H and the back beam, and the attachments thereof, the reel-supports J J pass loosely through the frame D, as at $f$ $f$, and the finger-beam and back beam are suspended from the reach by means of chains N N', cross-bar O O', and levers P P', which latter are held in any desired position by means of a notched adjusting-standard, Q Q', of the reach, as represented. The levers P P' are arranged in close relation to the driver's seat, and both can be operated simultaneously or separately, as occasion may demand, with the greatest ease and convenience.

It will be seen that as the shafts I I', with their pinions I$^2$ I$^3$, are on arms whose axis of motion is the axle of the right-hand driving-wheel, the gear-wheels I$^2$ I$^3$ will sweep round in a circle, and thus always occupy a position to receive motion from the spur-wheel G, with which the intermediate pinion, I$^2$, gears in order to actuate the cam-motor of the cutting apparatus.

It will also be seen that, as the reel-supports are mounted upon the finger-beam and stayed and guided by the rigid carriage-frame D, the reel R will be adjusted to a greater or less extent or height from the ground, accordingly as the finger-beam is adjusted, and when thus adjusted will be in a great degree stayed by the frame at $ff$ against any extra resistance of the grain to its blades. We have also provided for an independent adjustment of the height of the reel by forming screw-threads $g$ on the lower ends of the supports, and furnishing said threads with nuts $h\ h$.

It will further be seen that the back beam, L, may be readily adjusted when it is desired to throw it up out of the way, which is the case in mowing grass and other substances than grain. When thus adjusted, it aids in supporting the grain end of the finger-beam as well as in bracing the whole machine. By supporting the grain end of the finger-beam the tendency to "sag" down is greatly reduced. Again, it will be seen that the back beam may be readily let down to receive and support the platform while reaping grain.

The leading ideas in the arrangement thus far described are the lessening of side draft, the taking of the sag out of the finger-beam, and the independent and also the united adjustment of the main portions of the harvester from one position or driver's seat on the draft-frame, and at the same time the bracing of the reel and the maintenance of the gearing-connection. Our finger-beam H extends laterally under the side-draft carriage, between the front and hind wheels, the full width of the carriage, and thus the weight of its grain portion is very nearly balanced, and very little chance to sag down exists. This arrangement, in connection with the four wheels and the long reach, obviates to a great extent the side draft, which is so disastrously experienced in many styles of harvesters.

The cutting apparatus consists of either a pair of barbed scalloped sickles, $x$, such as shown in Fig. 4, or of a series of shear-blades, $x'$, such as shown in Fig. 5. In the use of either of these we extend the shaft I' of the gear-wheel I³ so that it reaches nearly to the grain end of the finger-beam, and in or on the circumference of this extended portion are formed oblique endless cam-grooves T V, one portion of the grooves being arranged the converse of the other portion or set, so that one of the sickle-bars or one of each pair of shear-blades shall move to the right while the other moves to the left, and vice versa. The sickles or the shears, whichever may be in use, are connected to levers $s\ s$, which are pivoted to the finger-beam, as at $t\ t$, and have a friction-roller on their rear ends, said rollers traversing the oblique endless grooves as the shaft revolves, and thereby receiving and imparting converse reciprocating motions to the sickles or shears, as above stated. The guard-fingers W are attached to the top plate, X, of the finger-beam H, so as to stand above the sickles or shears. Near each end of said plate a spear-pointed divider, Y, is arranged, as represented. The plate X covers the revolving cam-shaft, and also supports the front end of the grain-platform. The reel R overhangs the cutting apparatus, as usual, and as it has two inner supports may not require a grain side support; but in the drawings such a third support, Z, is represented. The belt of the reel passes around a pulley, $u$, on the inner face of the left-hand hind wheel of the side-draft carriage.

We are aware that a cam-shaft behind the finger-beam for operating one set of shear-blades while the other is stationary is old. We also are aware that cams otherwise located have been employed for producing reciprocating motion in sickle-blades or a scalloped cutter; but

What we claim as our invention, and desire to secure by Letters Patent, is—

1. A shaft, I, adapted to the location shown, and provided with converse-acting cams T U, in combination with converse-acting cutters, in the manner and for the purpose described.

2. The combination of the revolving cam-shaft I T U, radial arms K, and gearing of the draft-frame with the upper and under cutters, all constructed, arranged, and operating substantially in the manner and for the purpose described.

3. So fitting the reel-supports to guides $ff$ in the draft-frame that they are both guided and stayed above the points where they are fastened in the finger-beam, substantially as described.

4. The draft-frame constructed substantially as described, so that it may be increased or decreased in width, for the purpose set forth.

5. The swinging radial arms M on the hind axle, substantially as and for the purposes set forth.

6. The back beam, L, in connection with the swinging radial arms M, suspending and adjusting lever P', and grain end of the finger-beam, substantially as and for the purposes set forth.

7. The arrangement of the back beam, L, and the finger-beam H on the side-draft frame so that they may be adjusted from the one driver's seat either separately or together, substantially as and for the purposes set forth.

JABEZ J. PIGGOTT.
C. L. CROWELL.

Witnesses to signature of Jabez J. Piggott:
CASPER THIELL,
HENRY KENTCHLER.

Witnesses to signature of C. L. Crowell:
S. W. CROME,
BERNARD BAILY.